Patented June 24, 1930

1,766,461

UNITED STATES PATENT OFFICE

WALTER O. SNELLING, OF ALLENTOWN, PENNSYLVANIA

DETECTOR ELEMENT

No Drawing. Application filed March 7, 1923. Serial No. 623,547.

My invention relates to current rectifying devices of the general nature of natural crystal detectors, and more particularly relates to improvements in contact rectifiers suitable for use as detectors of radio waves.

I have discovered that the product resulting from the partial reduction of a metallic oxide by an element of the sulfur group possesses current rectifying ability or unidirectional conductivity to a remarkable extent.

As an example of my invention, I will describe one method by means of which I may prepare a detector element suitable for use in the rectification of radio waves, and possessing exceptional sensitiveness.

I first compress ordinary commercial litharge in a suitable mold, to form a button or pellet of desired form and size. A pellet from one to two millimeters in thickness and from five to ten millimeters in diameter forms a particularly desirable size. In compressing my litharge in my mold to form a button or pellet, I find it advantageous to employ a mechanical or hydraulic press, and to use a pressure in excess of 100 kg. per square centimeter of surface area of the pellet or button, and a pressure of 1,000 kg. per square centimeter or higher may be employed to advantage.

The pellet or button formed as the result of the compressing operation described consists of physically consolidated but chemically unaltered litharge. I next subject this pellet or button to partial reduction by vaporized sulfur, for this purpose placing the pellet or button in a suitable vessel, which may be of glass of high melting point, or of quartz or other suitable material, together with an amount of sulfur equal to from one to two times the weight of the pellet. I next apply heat to the tube or treating vessel, so as to bring the temperature within the vessel higher than the melting point of sulfur. Under these circumstances the sulfur melts, and covers the pellet. I find it advantageous to maintain the temperature within my treating vessel at a point higher than the melting point of sulfur but lower than its volatilizing point, for a period of from one-half minute to one or two minutes, the pellet of compressed oxide remaining during this period in contact with the molten sulfur. I now increase the temperature of the lower portion of my treating vessel until the sulfur is volatilized, but I permit the upper portion of my treating vessel to remain cool, so that the sulfur vapor produced in the lower portion of the vessel will reflux and run back continuously, boiling in the lower part of the treating vessel where the pellet of compressed oxide remains, and condensing in the upper part of the treating vessel, and running back when so condensed. I find it advantageous to continue this refluxing operation for from one to two minutes, during this period the pellet being maintained at a temperature in excess of the boiling point of sulfur, but being from time to time wet with liquid sulfur which refluxes and falls upon it from the upper cooler portions of the tube. As the temperature of the pellet or button is in excess of the boiling point of the sulfur, the contact of liquid sulfur with the pellet is of course of very short duration, the liquid sulfur boiling away rapidly as it drops down into the lower portion of the tube and comes in contact with the heated pellet.

I now apply still more heat to the lower portion of my treating vessel, until the pellet is brought to redness. Under these circumstances the portion of the tube containing the pellet is too hot to permit of any liquid sulfur running down, but is still filled with sulfur vapor. I find it advantageous to heat my pellet to redness in the sulfur vapor which is continually renewed by the refluxing of sulfur in the upper portions of the tube, for a period of from one to two minutes, the pellet being maintained meanwhile at a red heat.

Upon removing the pellet from the treating vessel and permitting it to cool in an inert atmosphere, it will be found to possess exceptional current rectifying characteristics, and forms a detector element of great sensitiveness. The product made as described is not lead sulfide, but is a complex admixture or compounds of lead, oxygen and sulfur, chemical examination of highly sensitive detector elements having disclosed the presence of a considerable part of the oxygen originally present in the litharge, and of but a portion of the amount of sulfur that would be present if the material were pure lead sulfide. The pellets made as described are characterized by physical toughness, but appear to be of progressively varying chemical composition from their interior to their exterior, the percentage of sulfide being highest and of oxygen being lowest at the outer surface, and the percentage of sulfur being lowest and the percentage of oxygen being highest in the interior of the pellet, this being no doubt the result of the progressive reduction of the litharge by the sulfur from the outside inward.

Detector elements made in accordance with my present invention, in addition to being highly sensitive to relatively weak radio signals, possess a uniformly high sensitiveness over their entire surface, and give signals of exceptional tone purity. It is well known that crystals of natural minerals such as galena give a clearer and cleaner response to incoming radio waves than ionic tubes of the usual type, but the pureness and clearness of the signals received by my improved detector element represents a great improvement over the results obtained from the usual crystal detectors.

Although I find that litharge forms a desirable oxide for use in the practice of my invention, and although I find that sulfur forms a desirable non-metallic element, my invention is by no means limited to the use of these materials, as I find that many other oxides, when partially reduced by elements of the sulfur group, give products having related characteristics. Other oxides of lead, such as red lead for example, and oxides of other metals such as bismuth oxide for example, and other elements of the sulfur group, such as selenium for example, may be used in the practice of my invention to obtain detector elements, the conductivity and the detecting characteristics of the resulting products being capable of being modified over a wide range by the selection of suitable metal oxide elements and suitable non-metallic elements.

It will of course be evident that instead of employing a free element of the sulfur group as a reducing agent, I may employ a compound which will provide available atoms under the conditions of temperature used in the step of partial reduction, and instead of employing a metal oxide I may employ a metal carbonate or other metal compound which will provide metal and oxygen atoms under the conditions of temperature employed in the treating step, the essential feature of my invention being the production of rectifying products by the partial reduction of a compound of a metal and oxygen by an element of the sulfur group.

The chemical composition of my finished detector elements is most complicated, and I believe that the remarkable detecting characteristics of my new products are factors of both their chemical composition and their physical structure. As has already been stated, the chemical composition of my finished product is progressively variable from the surface to the interior of the tablets, buttons or masses, the percentage of sulfur being highest at the exposed surface of the material, and the percentage of oxygen being highest in the interior of the masses of material. The physical structure is likewise progressively variable from the exterior to the interior of the tablets. It is my belief that the exceptional detecting or current rectifying characteristics of my new products is a factor of their Ionic or electron lattice structure, this being such as to provide a considerable number of loosely held, migratory or free electrons available for the carrying of electric current, but the number of such loosely held or migratory free electrons being too small to permit current between the detector element and a good electrical conductor in loose contact therewith to pass with equal facility in both directions. My new elements permit current to pass more readily from the element to a metallic conductor lightly touching it than it permits current to pass in the reverse direction, or more properly expressed, my new detector elements receives electrons from a loosely contacting body of high electrical conductivity with a different order of freedom than the detector element gives electrons to a loosely conducting body of good electrical conductivity.

In my prior Patent No. 1,742,324, I have described means by which the electrical conductivity and the current rectifying characteristics of contact rectifiers can be modified within wide limits. If instead of making buttons, tablets or masses of pure metal oxide I employ a mixture of metal oxide and a soluble, fusible or volatile diluent, it will be evident that I may impart a desirable degree of porosity to my detector element. By employing a mixture of 80 parts of litharge and 20 parts of sulfur for example, instead of pure litharge in the example of my invention previously given, it will be evident that a final product of lower density than would result from the subsequent treating operations on a pellet of pure litharge will result. The increased porosity of pellets made from a mixture of metal oxide or equivalent and a soluble, fusible or volatile diluent causes such products to react more readily with volatile elements of the sulfur group in my treating operations, and accordingly when I make pellets of low porosity I find it advantageous to contact my metal oxide or equivalent compound for a shorter period of time with my non-metal component than when a pure metal oxide is used, in order to avoid the complete reduction of my oxide component. It should be emphasized that products made in accordance with my present invention are not pure binary compounds, but contain a greater or less quantity of oxygen also. It is possible that the active agent in my new detector elements is an actual chemical compound of metal, oxygen and sulfur, but because of the progressive variation in composition which exists in my finished product, it is impossible to state that this is the case, and it may be that the active agent is a binary compound of lead and sulfur in solid solution in a metal-oxygen compound, or still more likely that the active agent is a solid solution of metal oxide in the metal-sulfide component, the solid solution of the two components having an ionic or electron lattice structure that is more favorable to the necessary degree of freedom of the electrons at a surface area of contact with an electrode of high electrical conductivity than exists in the case of either the pure metal-metalloid constituents or the pure metal oxide constituent.

Detector elements or contact rectifiers made in accordance with my present invention are strong, hard and tough, and when made in a mold having smooth surfaces, give products which conform in smoothness, size and shape with the surface of the mold. The color and appearance of my contact elements of course varies with the metal element and the non-metal element used. When litharge is the metal oxide element and sulfur is the non-metal element, and when the exact form of treatment described in the example is given, the resulting product has a silvery or metallic luster and its surface is sufficiently hard to resist abrasion from normal use. Under the microscope the surface presents a homogeneous metallic appearance, and no evidence of individual crystalline particles can be seen.

In the steps of contacting a metal oxide with liquid sulfur and with vaporized sulfur, I find that the use of superatmospheric pressure is advantageous. After completing my heating operations, I find that the use of reduced pressure in my treating vessel serves to remove the excess of sulfur vapor still present, and makes the removal of the treated pellet to another vessel unnecessary. The same result can be obtained, however, by cautiously heating the entire treating vessel to drive off the excess of sulfur present, and although I prefer to employ superatmospheric pressure in my treating operation and reduced pressure during my cooling step, I find that the entire treatment can be conducted at atmospheric pressure, and accordingly neither the use of increased or reduced pressure is essential to the practice of my invention.

It will be evident that many modifications may be made without departing from the essence of the invention as herein disclosed. Although I have illustrated my invention by a specific example or embodiment, it should be understood that my invention is not limited to the specific components or the specific treatment described, and no limitations should be imposed except such as are indicated in the appended claims.

I claim:

1. The process of preparing a contact rectifying product which comprises reducing an oxide of an element of the odd series of the fourth long period of the periodic classification of the elements having an atomic weight greater than 198 by an element of the sulfur group.

2. The process of preparing a contact rectifying product which comprises reducing oxide of lead by sulfur.

3. In the preparation of contact rectifying products the process which comprises heating an oxide of an element of the odd series of the fourth long period of the periodic classification of the elements having an atomic weight greater than 198 in the presence of an element of the sulfur group until at least partial reduction of the oxide occurs.

4. In the preparation of contact rectifying products the process which comprises heating an oxide of an element of the odd series of the fourth long period of the periodic classification of the elements having an atomic weight greater than 198 in the presence of sulfur until at least partial reduction of the oxide occurs.

5. In the preparation of contact rectifying products the process which comprises heating an oxide of lead in the presence of sulfur until at least partial reduction of the oxide occurs.

6. A contact rectifier comprising an intimate mixture of oxide of lead and sulfide of lead.

In testimony whereof, I have hereunto subscribed my name this 6th day of March, 1923.

WALTER O. SNELLING.